United States Patent [19]

Graff et al.

[11] 4,359,536

[45] Nov. 16, 1982

[54] FRIT GLASS COMPOSITION

[75] Inventors: William A. Graff, Willoughby; Jaroslaw Kohut, Parma Heights, both of Ohio

[73] Assignee: General Electric Company, Schenectady, N.Y.

[21] Appl. No.: 349,140

[22] Filed: Feb. 16, 1982

Related U.S. Application Data

[63] Continuation-in-part of Ser. No. 276,975, Jun. 24, 1981, abandoned.

[51] Int. Cl.$^3$ .......................... C03C 5/00; C03C 3/08
[52] U.S. Cl. ...................................... 501/25; 501/26; 501/79
[58] Field of Search .................. 501/17, 25, 26, 79

[56] References Cited

U.S. PATENT DOCUMENTS

| | | | |
|---|---|---|---|
| 2,660,531 | 11/1953 | Fraser | 501/26 |
| 2,726,965 | 12/1955 | Cressman et al. | 501/25 |
| 3,005,722 | 10/1961 | Cerulli | 501/26 |
| 3,207,706 | 9/1965 | Hoffman | 501/79 |
| 3,527,649 | 9/1970 | Sullivan | 501/26 |
| 4,224,074 | 9/1980 | Reade | 501/25 |
| 4,280,843 | 7/1981 | Graff | 501/26 |

*Primary Examiner*—M. L. Bell
*Attorney, Agent, or Firm*—John F. McDevitt; Philip L. Schlamp

[57] ABSTRACT

A novel frit glass composition is disclosed which is particularly useful to apply color coatings to the soda-lime glass envelopes of incandescent lamps. Specifically, the present glass frit can be combined with various inorganic coloring pigments to produce a colored coating when fired on the surface of the lamp glass envelope. The glass frit is a composition expressed in terms of weight percent, as calculated on the oxide basis, as follows:

| | |
|---|---|
| ZnO | 25–31 |
| $SiO_2$ | 12–20 |
| $B_2O_3$ | 19–35 |
| $Al_2O_3$ | 1–4 |
| $Na_2O$ | 5–10 |
| CaO | 7–9 |
| BaO | 2–6 |
| $ZrO_2$ | 0.5–4 |
| F | 1–2 |
| $K_2O$ | 0–6 |

6 Claims, No Drawings

FRIT GLASS COMPOSITION

This application is a continuation-in-part of our application Ser. No. 276,975, filed June 24, 1981, and now abandoned.

BACKGROUND OF THE INVENTION

This invention relates to particular zinc borosilicate glass compositions suitable for enamel coatings on soda-lime glass envelopes. More particularly, it relates to said glass compositions which are devoid of lead, arsenic, antimony and cadmium for ecological considerations and produce a reasonably optically clear colored coating when fired with an inorganic color pigment.

Lead-free zinc borosilicate glass compositions are known and have been used as colored frits for bonding to both metal and ceramic substrates. For example, U.S. Pat. No. 3,005,722 discloses such a glass composition for use in ceramic type electroluminescent lamp devices wherein the uncolored frit serves as a binder of phosphor particles when fused to a porcelainized iron plate. Colored enamels using said type glass compositions are also disclosed in U.S. Pat. No. 3,527,649 which can employ various inorganic pigments such as cadmium, selenium, iron, copper, cobalt and other metal compounds to produce highly colored glazes when fired on ceramic ware. A known zinc borosilicate frit glass for adherence to the soda-lime glass bulb surface of an incandescent lamp has a typical analysis in weight percent as follows: $ZnO$—28.3, $SiO_2$—19.4, $B_2O_3$—21.7, $Al_2O_3$—2.7, $Na_2O$—4.9, $K_2O$—6.1, $CaO$—4.3, $BaO$—3.7, $TiO_2$—4.5, F—2.8, and $Sb_2O_3$—1.6. This glass composition exhibits a linear thermal coefficient of expansion in the 0°-300° C. temperature range of approximately $70\text{-}80 \times 10^{-7}/\text{C.}°$ in order to accommodate the thermal expansion charcteristics of the soda-lime glass when bonded thereto during the firing at elevated temperatures.

In a formerly pending U.S. Pat. Application Ser. No. 148,917, filed May 12, 1980, in the name of W. A. Graff, and assigned to the present assignee, now U.S. Pat. No. 4,280,843, there is disclosed a zinc borosilicate frit enamel which is devoid of both lead and arsenic and which exhibits improved weather durability when fired on incandescent lamp envelopes. This glass frit consists essentially of about in weight percent: 18-25 $SiO_2$, 0-5 $TiO_2$, 7-12 $ZrO_2$, 18-21 ZnO, 4-6 BaO, 4-6 CaO, 2-4 $Na_2O$, 6-8 $K_2O$, 15-22 $B_2O_3$, 3-7 $Al_2O_3$, and 0-3 F, except for incidental impurities and refining agents. In the preferred embodiments the weight ratio of CaO to BaO is approximately 1 and the aggregate $ZnO+B_2O_3+SiO_2$ weight percent is in the approximate range 58-63%. For other preferred embodiments, the $TiO_2+ZrO_2$ aggregate weight percent is in the approximate range 11-13. The optical opacity of this glass frit, however, does not provide the gloss and clarity usually sought for many indoor lighting applications.

It would still be desirable, therefore, to develop a lead-free frit glass providing a clear or transparent colored appearance together with sufficient chemical durability for indoor lighting applications. It would be further desirable to provide these final product characteristics by compositional modification of the frit glass alone so that customary pigments and subsequent application of the colored enamel to a soda-lime glass envelope need not also be changed.

SUMMARY OF THE INVENTION

It has now been discovered, that a zinc borosilicate frit glass can be prepared for mixing with customary inorganic pigments to provide a clear glossy enamel coating with adequate chemical durability when fired on soda-lime glass envelopes in the conventional manner. Briefly stated, the present frit glass composition comprises in approximate weight percent, as calculated on the oxide basis:

| | |
|---|---|
| ZnO | 25-31 |
| $SiO_2$ | 12-20 |
| $B_2O_3$ | 19-35 |
| $Al_2O_3$ | 1-4 |
| $Na_2O$ | 5-10 |
| CaO | 7-9 |
| BaO | 2-6 |
| $ZrO_2$ | 0.5-4 |
| F | 1-2 |
| $K_2O$ | 0-6 | except for incidental impurities and refining agents. The average thermal coefficient of expansion for this glass frit lies in the range of $75\text{-}90 \times 10^{-7}/\text{C.}°$ over a 0°-300° C. temperature range to accommodate the thermal expansion characteristics of soda-lime glass and the frit glass softens at an elevated temperature during enamel firing without distorting the underlying glassware. In the preferred embodiments, the F content is maintained at about 2% to provide as low an enamel firing temperature as possible without sacrificing clarity of the fired on enamel. $Na_2O$ is preferred to $K_2O$ because it provides for a lower firing temperature and higher transparency of the enamel coating. The optimum content of $Na_2O+K_2O$ is about 10 weight percent. The sum of the $ZnO+B_2O_3$ content is optimum at about 60 weight percent of the frit composition, with the ratio of ZnO to $B_2O_3$ remaining in the vicinity of 1:1. The preferred total weight percent $ZnO+SiO_2+SiO_2+B_2O_3$ is about 70-75%. A preferred glass composition meeting all of the foregoing criteria consists essentially of, in weight percent:

| | |
|---|---|
| ZnO | 30 |
| $SiO_2$ | 14 |
| $B_2O_3$ | 30 |
| $Al_2O_3$ | 2 |
| $Na_2O$ | 10 |
| CaO | 7 |
| BaO | 4 |
| $ZrO_2$ | 1 |
| F | 2 | except for incidental impurities and refining agents. When the present frit glass is mixed in powder form with conventional amounts of inorganic pigment and thereafter suspended in a liquid slurry, there is provided a suitable enamel composition for deposition and firing on the soda-lime glass envelope surface to produce a chemically durable and glossy transparent colored coating. Typical proportions of inorganic pigment added to the present glass frit compositions to form an enamel slurry range from about 0.1 to 20.0 weight percent dependent on the color desired.

DESCRIPTION OF THE PREFERRED EMBODIMENTS

As above indicated, the presently improved frit glass composition is still primarily zinc borosilicate glass which further includes $ZrO_2$ and $Al_2O_3$ along with other critical oxides in limited proportions to provide a clear or transparent optical appearance along with satisfactory chemical durability while further exhibiting thermal expansion and viscosity characteristics suitable for firing on a soda-lime glass substrate. Preferred glasses according to the present invention are reported in Table I below along with glasses having similar compositions to include one previously identified prior art glass frit (Example #11) so that a comparison therebetween can be made. As is common in glass technology, said glass compositions are reported in terms of oxides as calculated from the batch starting materials. Although there may be a minor difference between the glass composition as calculated in this conventional manner from batch constituents and any actual glass composition obtained therefrom, both compositions will be essentially the same. There is only slight volatilization of the batch constituents in the present glass composition during melting such as by some loss of fluorine, boric oxide, and alkali metal oxides that is to be expected.

TABLE I

|  | #1 | #2 | #3 | #4 | #5 | #6 | #7 | #8 | #9 | #10 | #11 |
|---|---|---|---|---|---|---|---|---|---|---|---|
| ZnO | 10% | 15% | 40% | 44% | 25% | 20% | 30% | 27% | 28% | 30% | 28.3% |
| $SiO_2$ | 15 | 20 | 15 | 10 | 14 | 25 | 14 | 14 | 18 | 12 | 19.4 |
| $B_2O_3$ | 50 | 40 | 25 | 25 | 35 | 25 | 30 | 32 | 24 | 30 | 21.7 |
| $Al_2O_3$ | 4 | 5 | 3 | 3 | 1 | 2 | 2 | 1 | 3 | 3 | 2.7 |
| $Na_2O$ | 2 | 3 | 10 | 8 | 10 | 10 | 10 | 10 | 5 | 10 | 4.9 |
| $K_2O$ | 6 | 6 | — | 2 | — | — | — | — | 6 | — | 6.1 |
| CaO | 3 | 3 | 5 | 4.4 | 8 | 7 | 7 | 8 | 8 | 8 | 4.3 |
| BaO | 4 | 4 | — | 0.6 | 5 | 4 | 4 | 5 | 5 | 2 | 3.7 |
| $ZrO_2$ | 1 | 1 | — | — | 0.5 | 5 | 1 | — | 1 | 3 | — |
| $TiO_2$ | — | — | — | — | — | — | — | 1 | — | — | 4.5 |
| F | 2 | 2 | 2 | 3 | 1.5 | 2 | 2 | 2 | 2 | 2 | 2.8 |
| $Sb_2O_3$ | — | — | — | — | — | — | — | — | — | — | 1.6 |
| $Li_2O$ | 3 | 1 | — | — | — | — | — | — | — | — | — |
| Exp. Coeff. ($\times 10^{-7}/°C$) | — | — | — | — | 83.7 | 80.6 | 82.5 | 85.3 | — | — | 79.0 |
| Gloss Rating[1] | 1 | 1 | 1 | 2 | 1 | 1 | 1 | 1 | 1 | 1 | 1— |
| Opacity Rating[2] | 3 | 3 | 2 | 2 | 1 | 2— | 1 | 1— | 1— | 1 | 3 |

[1]Gloss Rating - 1 high gloss, 3 low gloss
[2]Opacity Rating - 1 low opacity, 3 high opacity It can be noted from the foregoing table that only the glass compositions in examples 5 and 7-10 reside within the present composition range and provide sufficient optical transparency in the fired enameled condition. While the prior art glass in example 11 demonstrated a glossy coating attributable to light reflection, the accompanying opacity to light transmission produced an unsatisfactory result.

To better illustrate the degree of correspondence between actual frit glass compositions of the present inventions and the calculated compositions reported in Table I above, the glass chemical analyses for examples 5 and 7-10 are listed in Table II below.

TABLE II

|  | #5 | #7 | #8 | #9 | #10 |
|---|---|---|---|---|---|
| ZnO | 25.55 | 29.94 | 27.59 | 30.59 | 29.98 |
| $SiO_2$ | 13.94 | 14.76 | 14.55 | 19.23 | 13.48 |
| $B_2O_3$ | 34.59 | 29.91 | 31.62 | 19.01 | 29.39 |
| $Al_2O_3$ | 1.09 | 2.00 | 1.11 | 3.22 | 3.06 |
| $Na_2O$ | 9.86 | 9.80 | 9.70 | 5.59 | 9.36 |
| $K_2O$ | — | — | — | 5.27 | — |
| CaO | 8.13 | 7.20 | 8.17 | 8.88 | 8.15 |
| BaO | 5.47 | 4.34 | 5.38 | 5.91 | 2.41 |
| $ZrO_2$ | 0.68 | 1.20 | — | 1.24 | 3.22 |
| F | 1.47 | 1.83 | 1.83 | 2.05 | 1.63 |
| $TiO_2$ | — | — | 1.01 | — | — |

From said comparison on the same oxide basis, it will be apparent that only the example 9 glass frit experiences more than a 1% difference in some oxide contents when the batch formulations are melted in the conventional manner.

It will be apparent from the foregoing description that a novel frit glass composition is provided for general indoor lighting use with soda-lime glass objects. It will also be apparent that minor variations in said glass compositions other than those specifically disclosed are included within the scope of the present invention. It is intended to limit the present invention, therefore, only by the scope of the following claims.

What we claim as new and desire to secure by United States Letters Patent is:

1. A lead-free frit glass exhibiting transparency and gloss with an average thermal coefficient of expansion between 0°-300° C. in the range $75°-90 \times 10^{-7}/°$ C. consisting essentially of in weight percent on the oxide basis: 25-31 ZnO, 12-20 $SiO_2$, 19-35 $B_2O_3$, 1-4 $Al_2O_3$, 5-10 $Na_2O$, 7-9 CaO, 2-6 BaO, 0.5-4 $ZrO_2$, 1-2 F and 0-6 $K_2O$ except for incidental impurities and refining agents.

2. A frit glass as in claim 1 further containing approximately 0.1 to 20 weight percent of an inorganic pigment.

3. A frit glass as in claim 1 wherein the aggregate $ZnO + SiO_2 + B_2O_3$ content is at least 70 weight percent.

4. A frit glass as in claim 1 wherein the aggregate $ZnO + B_2O_3$ content is about 60 weight percent.

5. A frit glass as in claim 4 wherein the weight ratio between ZnO and $B_2O_3$ is about 1:1.

6. A frit glass as in claim 1 consisting essentially of about, in weight percent:

| | |
|---|---|
| ZnO | 30 |
| $SiO_2$ | 14 |
| $B_2O_3$ | 30 |
| $Al_2O_3$ | 2 |
| $Na_2O$ | 10 |
| CaO | 7 |
| BaO | 4 |
| $ZrO_2$ | 1 |
| F | 2 | except for incidental impurities and refining agents.

* * * * *